(12) United States Patent
Baker et al.

(10) Patent No.: US 11,766,900 B2
(45) Date of Patent: Sep. 26, 2023

(54) TIRE HAVING A CONDUCTIVE CORD

(71) Applicant: Bridgestone Americas Tire Operations, LLC, Nashville, TN (US)

(72) Inventors: Christopher R. Baker, Akron, OH (US); Ruben L. Madrid, Marfa, TX (US); Justin M. Gehres, Uniontown, OH (US); Kathleen A. Clemmer, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 834 days.

(21) Appl. No.: 16/467,123

(22) PCT Filed: Dec. 6, 2017

(86) PCT No.: PCT/US2017/064924
§ 371 (c)(1),
(2) Date: Jun. 6, 2019

(87) PCT Pub. No.: WO2018/111650
PCT Pub. Date: Jun. 21, 2018

(65) Prior Publication Data
US 2019/0308470 A1    Oct. 10, 2019

Related U.S. Application Data

(60) Provisional application No. 62/433,461, filed on Dec. 13, 2016.

(51) Int. Cl.
*B60C 19/08* (2006.01)
*B60C 19/00* (2006.01)

(52) U.S. Cl.
CPC ............ *B60C 19/082* (2013.01); *B60C 19/08* (2013.01); *B60C 19/086* (2013.01); *B60C 19/088* (2013.01); *B60C 2019/008* (2013.01)

(58) Field of Classification Search
CPC ... B60C 19/082; B60C 19/084; B60C 19/086; B60C 19/088; B60C 2019/008
See application file for complete search history.

(56) References Cited

U.S. PATENT DOCUMENTS 4,776,160 A    10/1988  Rees
5,287,690 A    2/1994   Toon
(Continued)

FOREIGN PATENT DOCUMENTS

EP    1621365    2/2006
EP    2567833    3/2013
(Continued)

OTHER PUBLICATIONS

Machine translation for Japan 2009-154608 from EPO (Year: 2022).*
(Continued)

*Primary Examiner* — Steven D Maki
(74) *Attorney, Agent, or Firm* — Shaun J. Fox; Bryan J. Jaketic

(57) ABSTRACT

A tire includes at least one annular structure configured to interface with a wheel. The tire also includes a circumferential tread disposed in a crown region of the tire and an intermediate elastomeric layer having a conductive bleeder cord. The conductive bleeder cord extends from the annular structure to at least a middle third of a tread width and includes a metallic component that conducts electric charge and a textile component that permits gas evacuation.

9 Claims, 7 Drawing Sheets

(56) References Cited

U.S. PATENT DOCUMENTS

| | | |
|---|---|---|
| 5,881,547 A | 3/1999 | Chiou et al. |
| 5,927,060 A | 7/1999 | Watson |
| 7,000,295 B2 | 2/2006 | Andrews |
| 8,495,766 B2 | 7/2013 | Carraro |
| 9,277,684 B2 | 3/2016 | Laurent et al. |
| 9,307,685 B2 | 4/2016 | Harris et al. |
| 2005/0087275 A1 | 4/2005 | Zanzig et al. |
| 2005/0282009 A1 | 12/2005 | Nusko et al. |
| 2006/0102264 A1* | 5/2006 | Nicolas .................. B60C 19/08 152/152.1 |
| 2008/0318483 A1 | 12/2008 | Salitsky et al. |
| 2010/0300060 A1 | 12/2010 | Hsu |
| 2011/0047957 A1 | 3/2011 | Richard |
| 2011/0068098 A1 | 3/2011 | Li |
| 2013/0056128 A1* | 3/2013 | Kanz ...................... B60C 19/08 152/548 |
| 2013/0174951 A1* | 7/2013 | Schunack ............. B60C 19/084 252/502 |
| 2013/0284330 A1 | 10/2013 | Nagai |
| 2014/0283964 A1 | 9/2014 | Van Der Meulen et al. |
| 2014/0373990 A1 | 12/2014 | Kawakami |
| 2015/0328941 A1* | 11/2015 | Hirosue ................ B60C 19/082 152/539 |
| 2017/0259626 A1* | 9/2017 | Hata .................... B60C 11/005 |
| 2018/0154705 A1* | 6/2018 | Moser .................. B60C 19/088 |
| 2018/0178595 A1* | 6/2018 | Svenson ............... B60C 11/005 |
| 2019/0344629 A1* | 11/2019 | Verstraeten .............. D02G 3/36 |
| 2021/0316575 A1* | 10/2021 | Svenson ................ B60C 19/12 |

FOREIGN PATENT DOCUMENTS

| | | |
|---|---|---|
| EP | 3403855 | 11/2018 |
| JP | 2009-154608 A * | 7/2009 |
| JP | 2009154608 | 7/2009 |
| WO | 2014139825 | 9/2014 |
| WO | 2018011001 | 1/2018 |

OTHER PUBLICATIONS

Extended Search Report; Corresponding European Application No. 17881086.7; Authorized Officer Joaquim Carneiro, dated Jul. 27, 2020.

International Search Report & Written Opinion; Corresponding PCT Application No. PCT/US2017/064924; Authorized Officer Jin Ho Kim; dated Mar. 21, 2018.

Keymeulen, Lieven; Bekinox® VN, Continuous stainless steel filament for electro-conductive textiles; Jun. 2012.

Drexel University (Contact Britt Faulstick, britt.faulstick@drexel.edu); Holding Energy By The Threads: Drexel Researchers Spin Cotton Into Capacitive Yarn; Mar. 5, 2015.

* cited by examiner

TIRE HAVING A CONDUCTIVE CORD

FIELD OF INVENTION

The present disclosure is directed to tires having conductivity paths for conducting electric charge. More particularly, the present disclosure is directed to tires having a cord that conducts an electric charge.

BACKGROUND

Known tires contain materials that inhibit the conduction of electric charge. For example, tires having relatively high amounts of silica are known to accumulate static charge, which is undesirable for vehicle operation. Tires having relatively high amounts of silica previously used antennas to dissipate charge.

SUMMARY OF THE INVENTION

In one embodiment, a tire includes a first annular bead and first abrasion area, wherein the first abrasion area has a resistivity of at least $5.9 \times 10^7$ ohm-cm. The tire further includes a second annular bead and second abrasion area, wherein the second abrasion area has a resistivity of at least $5.9 \times 10^7$ ohm-cm. A body ply extends between the first annular bead and the second annular bead, wherein the body ply contains reinforcement cords. The tire also includes a circumferential belt disposed radially upward of the body ply and extending axially across a portion of the body ply. At least one cap ply is disposed radially upward of the at least one reinforcement ply and extends axially across a portion of the body ply. The cap ply has a resistivity of at least $13.0 \times 10^7$ ohm-cm. The tire further includes a circumferential tread disposed radially upward of the circumferential belt and extending axially across a portion of the body ply, wherein the circumferential tread has resistivity of at least $13.7 \times 10^7$ ohm-cm. The tire also has a first sidewall extending between the first annular bead and a first shoulder, the first shoulder being associated with the circumferential tread, wherein the first sidewall has a resistivity of at least $11.9 \times 10^7$ ohm-cm. Additionally, the tire has a second sidewall extending between the second annular bead and a second shoulder, the second shoulder being associated with the circumferential tread, wherein the second sidewall has a resistivity of at least $11.9 \times 10^7$ ohm-cm. The tire also has a plurality of bleeder cords associated with the body ply and disposed circumferentially about the tire and radially between the circumferential tread and the body ply, wherein the plurality of bleeder cords includes at least one conductive bleeder cord formed of a stainless steel-cotton blend yarn having a stainless steel-to-cotton ratio between 55:45 and 90:10.

In a second embodiment, a tire includes at least one annular structure configured to interface with a wheel. The tire also includes a circumferential tread disposed in a crown region of the tire and an intermediate elastomeric layer having a conductive bleeder cord. The conductive bleeder cord extends from the annular structure to at least a middle third of a tread width and includes a metallic component that conducts electric charge and a textile component that permits gas evacuation.

In a third embodiment, a tire includes a body ply sheet having a rubber core defined by a top surface having a length and a width, a bottom surface having substantially the same length and width, and side surfaces having a common height. The rubber core is further defined by a top rubber layer and a bottom rubber layer. The body ply sheet further includes reinforcement cords disposed between the top rubber layer and the bottom rubber layer, wherein the reinforcement cords are spaced apart from each other and span the width of the body ply sheet. Bleeder cords are configured to vent gas from the tire during vulcanization, wherein the bleeder cords are disposed on the body ply sheet and spaced 6-14 cm apart from each other. Conductive cords are configured to dissipate electric charge from the tire after vulcanization, wherein the conductive cords are disposed on the body ply, are spaced 20-80 cm apart from each other. The conductive cords are formed of a metallic-cotton blend yarn having a metallic-to-cotton ratio between 55:45 and 90:10.

BRIEF DESCRIPTION OF THE DRAWINGS

In the accompanying drawings, structures are illustrated that, together with the detailed description provided below, describe exemplary embodiments of the claimed invention Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 2b is a simplified cross-sectional view of an alternative embodiment of the tire shown in FIG. 2a;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1A:
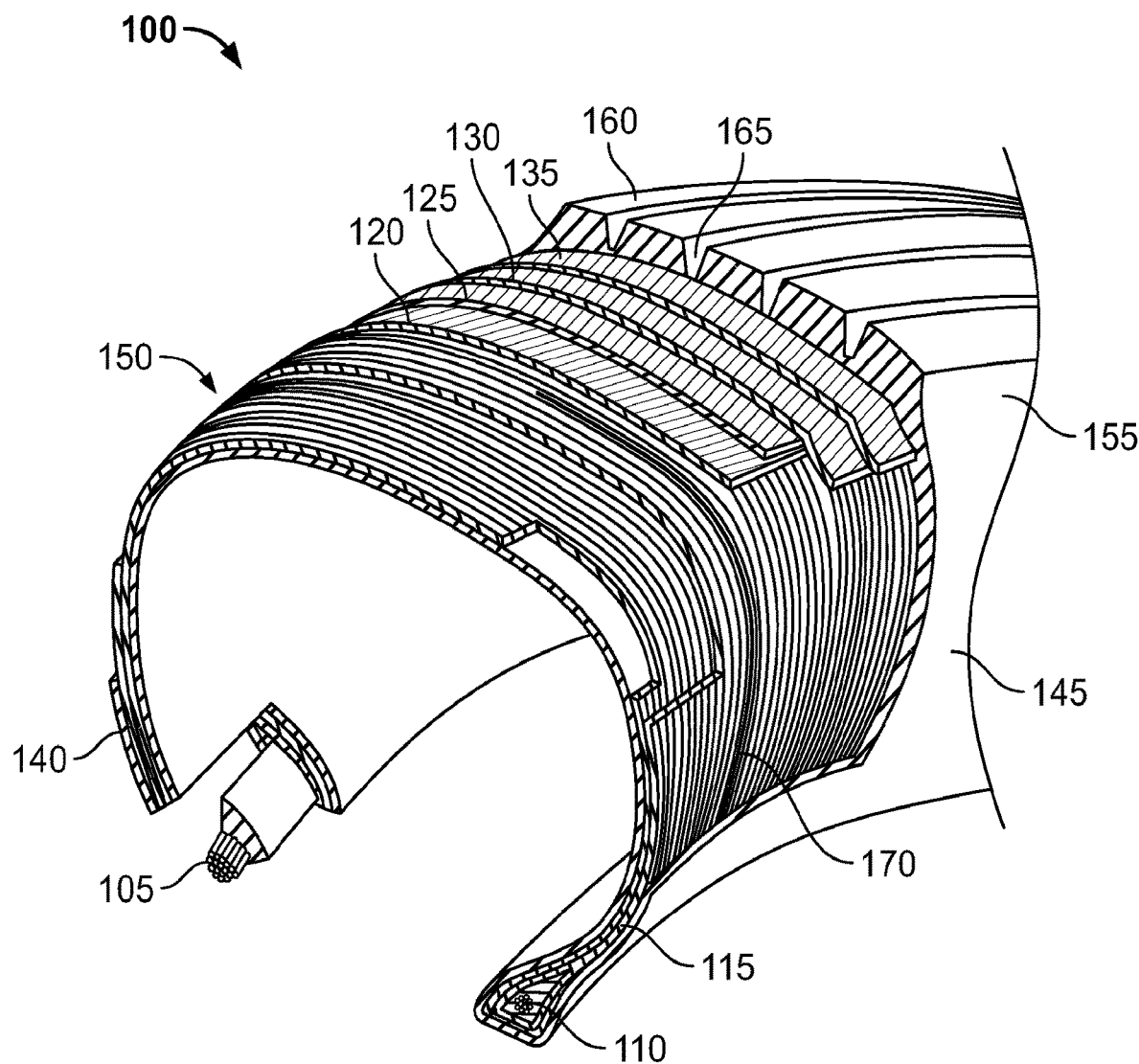
FIG. 1a is a peel-away perspective view of one embodiment of a tire including a conductivity path.

FIG. 1a is a peel-away perspective view of one embodiment of a tire 100. Tire 100 includes a first annular bead 105 and a second annular bead 110. The annular beads, in part, secure the tire to a wheel. In this regard, each bead is an annular structure that is configured to interface with a wheel (and in particular, the wheel rim). In an alternative embodiment (not shown), the tire comprises four or more beads.

The tire 100 further includes a body ply 115, which imparts shape to the tire, extending between first annular bead 105 and second annular bead 110. The body ply 115 extends around the first annular bead 105 and the second annular bead 110. In the illustrated embodiment, turn-up portions of the body ply 115 terminate in the bead regions of the tire. In alternative embodiments, turn-up portions of the body ply may terminate in the sidewall regions or crown regions of the tire. As one of ordinary skill in the art will understand, body ply 115 may contain reinforcing cords or fabric (not shown). In one particular embodiment, the body ply does not contain steel (e.g., any reinforcement cords in the body ply lack steel). In an alternative embodiment (not shown), multiple body plies are utilized.

A first circumferential belt 120 and a second circumferential belt 125 are disposed radially upward of body ply 115 and extend axially across a portion of body ply 115. As one of ordinary skill in the art will understand, first circumferential belt 120 and second circumferential belt 125 may contain steel cords and reinforcing cords (both not shown). In an alternative embodiment (not shown), a third circumferential belt is provided. In another alternative embodiment, the circumferential belts lack metal.

A cap ply 130 is disposed radially upward of first circumferential belt 120 and second circumferential belt 125. Cap ply 130 extends axially across a portion of body ply 115. In an alternative embodiment (not shown), the tire includes a second cap ply. In another alternative embodiment, a sealing gel layer is provided in the cap ply region.

The tire 100 also includes an undertread 135 disposed radially upward of the circumferential belts 120 and 125 and cap ply 130. The undertread 135 extends axially across a portion of body ply 115. An undertread is typically comprised of rubber, and its thickness may vary depending on tire application. For instance, in retreading applications, a thicker undertread is desired to accommodate buffing. In passenger tire applications, by comparison, a thinner undertread is desired.

The tire 100 further comprises a first sidewall 140 and a second sidewall 145. First sidewall 140 extends between the first annular bead 105 and a first shoulder 150, which is proximately associated with an edge of circumferential tread 160. Second sidewall 145 extends between the second annular bead 110 and a second shoulder 155, which is proximately associated with the opposite edge of circumferential tread 160.

The tire 100 further includes a circumferential tread 160, which as one of ordinary skill in the art will understand, is disposed in the crown region of the tire. In the illustrated embodiment, the circumferential tread 160 is separated by circumferential grooves 165, which divide circumferential tread 160 into five ribs. However, it should be understood that the circumferential tread may include any combination of grooves, ribs, block, lugs, or other tread elements. In most applications, the circumferential tread is affixed to the tire when the tire is new. In an alternative embodiment, the circumferential tread is affixed as a retread.

Tire 100 further comprises a conductive cord 170. Conductive cord 170 is disposed radially between circumferential tread 160 and body ply 115. In the illustrated embodiment, the conductive cord 170 has a first end located in the center of the tread region of the tire 100, and the conductive cord 170 terminates at a second end located in the second annular bead region 110. In other embodiments, the conductive cord has a first end located anywhere between the first bead region of the tire and the second belt edge of the tire, and the conductive cord terminates at the second bead region of the tire. While a bead-to-bead configuration would provide a maximum conductivity path for a given cord, a bead-to-belt edge configuration may provide an adequate conductivity path for a given tire.

In one particular embodiment, the conductive cord 170 extends from a region within the middle 80% of the width of the circumferential tread 160, through the second shoulder region 155 and second sidewall region 145, to an abrasion area associated with the second annular bead 110. As one of ordinary skill in the art will understand, the abrasion area is a rubber region that is situated between the body ply and a wheel rim.

In another embodiment (not shown), the tire further comprises a second conductive filament that extends from a region within the middle 80% of the width of the circumferential tread, through the second shoulder region and second sidewall region, to the abrasion area associated with the second annular bead. In this embodiment, the second conductive cord is disposed opposite circumferentially to the conductive cord. Thus, approximately 170-190° separate the first and second cords.

In yet another embodiment (also not shown), the tire further comprises a second conductive cord and a third conductive cord. In this embodiment, the second and third conductive cords are disposed generally equidistantly around a tire circumference. Thus, approximately 110-130° separate the first, second, and third cords. In other embodiments, any number of conductive cords may be employed. The conductive cords may be regularly spaced about the tire, or they may be irregularly spaced about the tire.

In one specific embodiment of the tire described in FIG. 1a, the first and second abrasion areas each have a resistivity of at least $5.9 \times 10^7$ ohm-cm, the sidewalls have a resistivity of at least $11.9 \times 10^7$ ohm-cm, the cap ply skim has a resistivity of at least $13.0 \times 10^7$ ohm-cm, and the circumferential tread has resistivity of at least $13.7 \times 10^7$ ohm-cm.

Figure 1B:
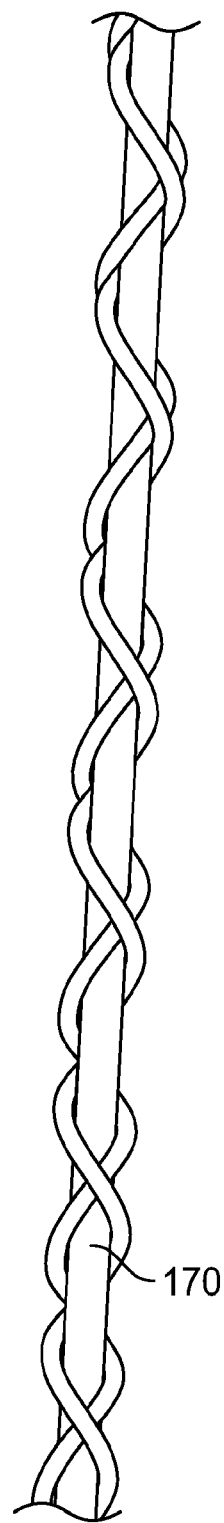
FIG. 1b is a perspective view of a conductive bleeder cord.

FIG. 1b is a perspective view of one embodiment of a conductive bleeder cord 170. Conductive cord 170 may be constructed from a variety of textile materials, such as yarns or cords. In one embodiment, the cord is coated or blended with a metallic component. In an alternative embodiment, the cord includes a continuous metallic component.

Figure 2A:
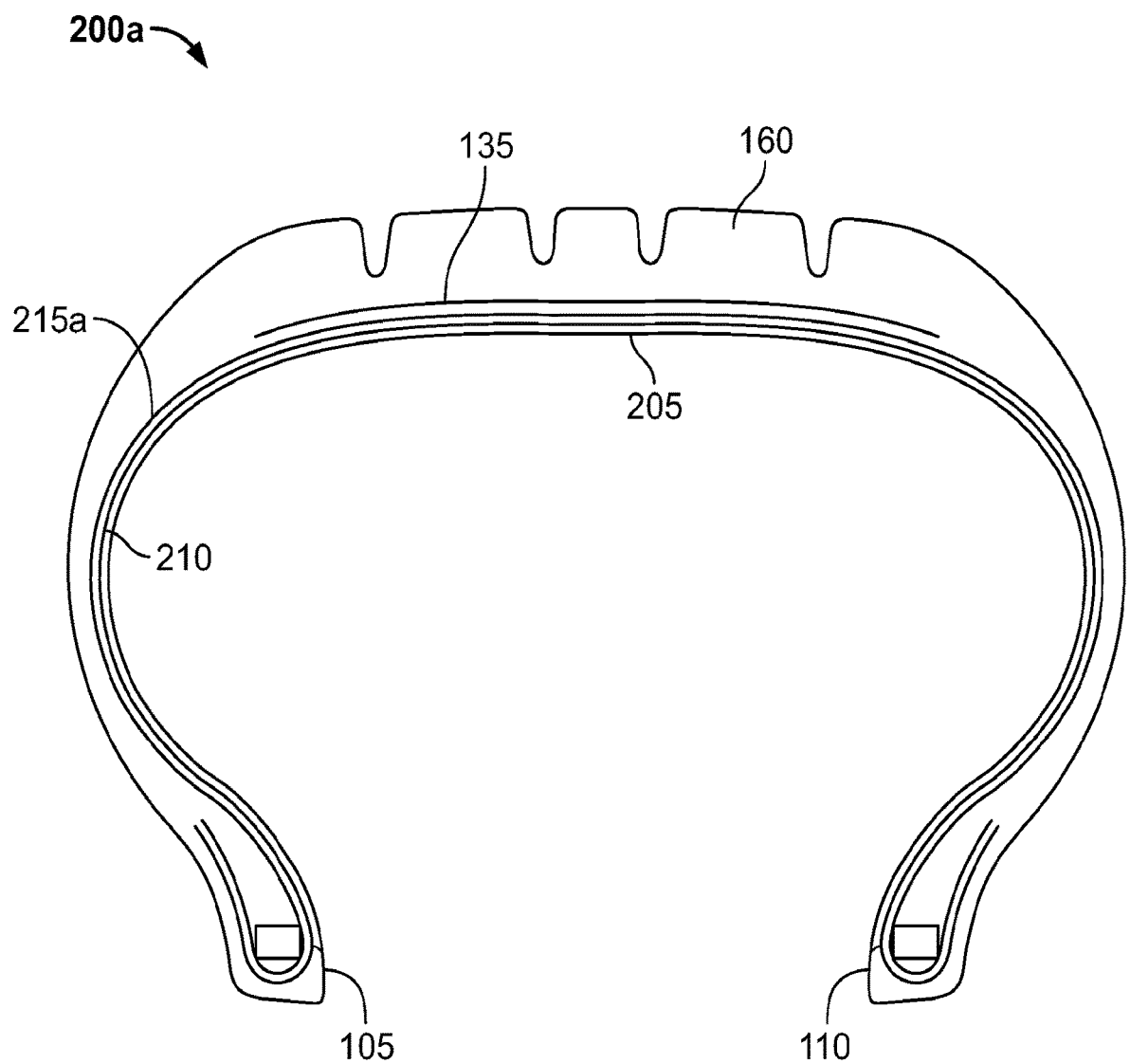
FIG. 2a is a simplified cross-sectional view of a tire including a conductive bleeder cord.

FIG. 2a is a simplified cross-sectional view of a tire including a conductive bleeder cord. Tire 200a includes various components from tire 100, which are identified with like numbering.

Tire 200a, in addition to tire 100, further includes an innerliner 205 and an intermediate elastomeric layer 210. Innerliner 205 is a continuous, thin layer of material that hinders air from escaping through the tire. Innerliner 205 extends axially across a portion of the intermediate elastomeric layer 210.

As shown, intermediate elastomeric layer 210 is disposed between undertread 135 and innerliner 205. Intermediate elastomeric layer 210 extends between bead 105 and bead 110. Intermediate elastomeric layer 210 may include bleeder cords (not shown), which help allow gas to vent from the tire during curing. In an alternative embodiment (not shown), the intermediate elastomeric layer includes separate subcomponents (e.g., a body ply, a belt package, reinforcement and/or cap plies, and sidewalls). In one particular embodiment, the intermediate elastomeric layer is a body ply.

With continued reference to FIG. 2a, tire 200a includes a conductive bleeder cord 215. As shown, conductive bleeder cord 215a extends from bead 105 to bead 110 through the intermediate elastomeric layer 210. In an alternative embodiment (not shown), the conductive bleeder cord is disposed on a top surface of the intermediate elastomeric layer.

Although not shown in FIG. 2a, conductive bleeder cord 215a includes a metallic component that conducts electric charge and a textile component that permits gas evacuation. In one known embodiment, the conductive bleeder cord has a resistivity between 2.8 and $4.0 \times 10^4$ ohm-cm. In one embodiment, the metallic component alone has a resistivity between 2.95 and $3.17 \times 10^4$ ohm-cm.

In one embodiment, the metallic component in conductive bleeder cord 215a is a solid, conductive metal. In a particular embodiment, the metallic component is made of steel. In another particular embodiment, the metallic component is made of steel and has a thickness of between 0.2 and 0.7 mm.

In another embodiment, the textile component in conductive bleeder cord 215a is made of cotton. In a particular embodiment, the textile component is wrapped around the metallic component. In another particular embodiment, the metallic component is blended with the textile component. In one blended embodiments, the conductive bleeder cord has a linear mass density between 200 and 320 tex. In an alternative blended embodiment, the conductive bleeder cord has a linear mass density between 100 and 200 tex. In another alternative blended embodiment, the conductive bleeder cord has a linear mass density between 50 and 150 tex. In still another alternative blended embodiment, the conductive bleeder cord has a linear mass density between 320 and 450 tex. However, it should be understood that blended bleeder cords of any mass density may be employed In one specific embodiment, the conductive bleeder cord is formed of a stainless steel-cotton blend yarn having a stainless steel-to-cotton ratio between 55:45 and 90:10. In another specific embodiment, the conductive bleeder cord is formed of a stainless steel-cotton blend yarn having a stainless steel-to-cotton ratio between 70:30 and 85:15. In yet another specific embodiment, the conductive bleeder cord is formed of a stainless steel-cotton blend yarn having a stainless steel-to-cotton ratio between 55:45 and 90:10.

Figure 2B:
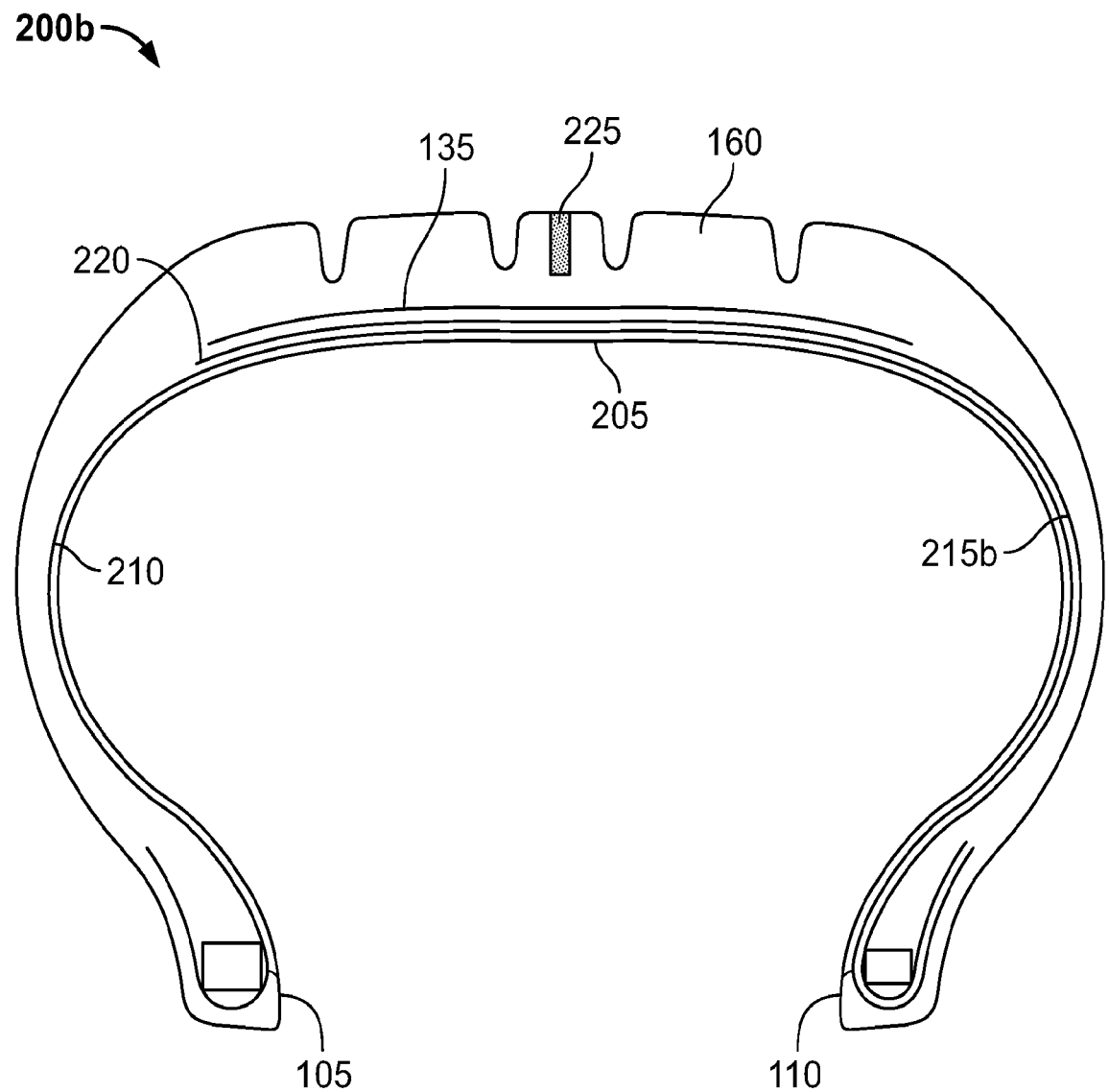

FIG. 2b is a simplified cross-sectional view of an alternative embodiment of the tire shown in FIG. 2a. In FIG. 2b, tire 200b includes a conductive bleeder cord 215b, a belt package 220, and an antenna 225.

In tire 200b, conductive bleeder cord 215b extends from bead 110 to the edge of belt package 220. Belt package 220 includes at least one circumferential belt having steel cords. Antenna 225 features conductive material that allows charge to dissipate from the tire to the ground. Thus, in tire 200b, charge dissipates from bead 110, through the intermediate elastomeric layer 210 (through the sidewall and belt package, via the conductive bleeder cord which is disposed adjacent to the belt package), through antenna 225, and then to ground.

In one embodiment, the antenna 225 has a resistivity between $1 \times 10^5$ ohm-cm and $1 \times 10^6$ ohm-cm. In an alternative embodiment, the antenna 225 has a resistivity of at least $1 \times 10^5$ ohm-cm. The resistivity of the antenna may be adjusted by using different compounds.

Figure 2C:
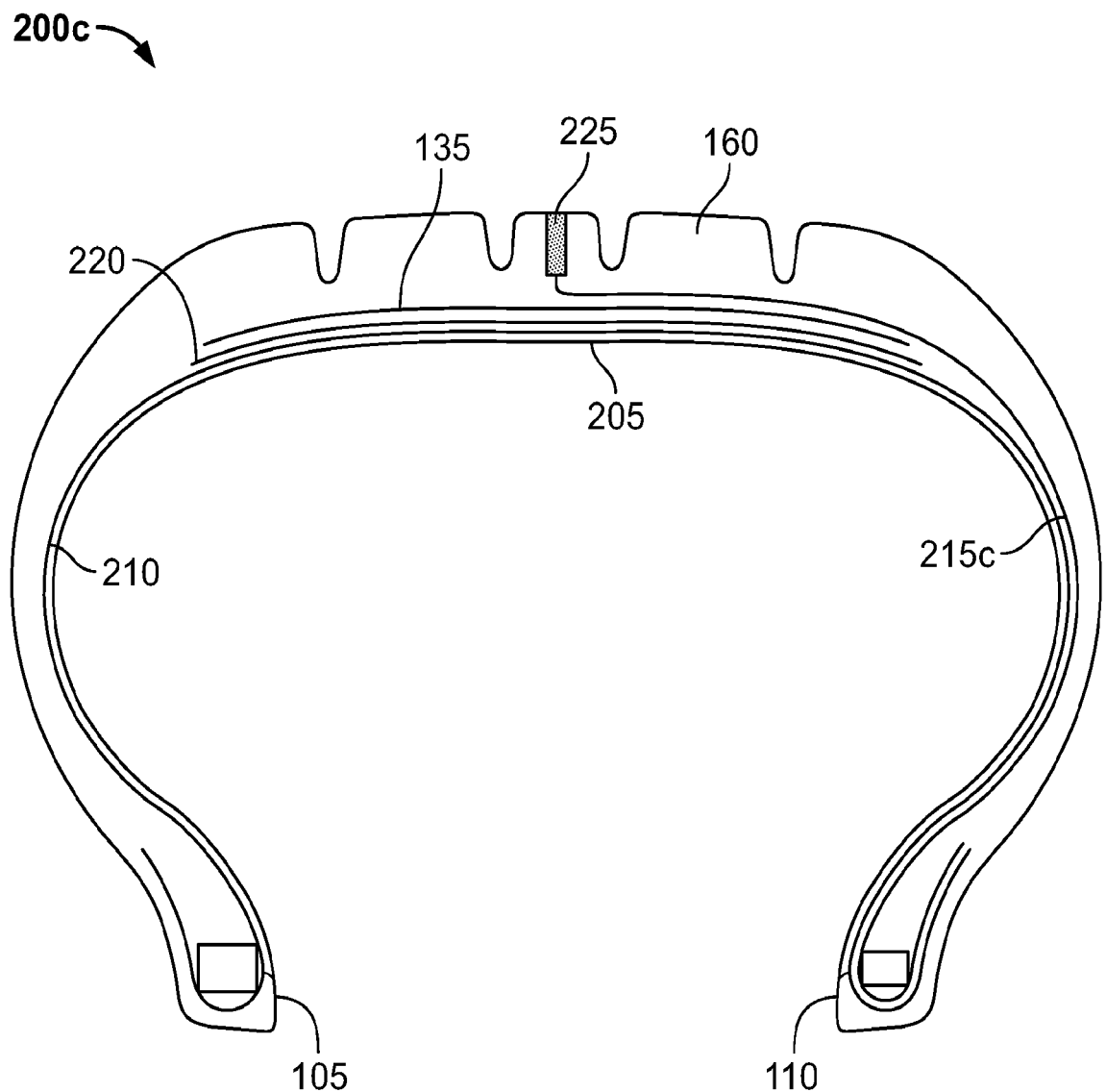
FIG. 2c is a simplified cross-sectional view of an alternative embodiment of the tires shown in FIG. 2a and FIG. 2b.

FIG. 2c is a simplified cross-sectional view of an alternative embodiment of the tires shown in FIG. 2a and FIG. 2b. In tire 200c, the conductive bleeder cord 215b extends from bead 110 to antenna 225. Thus, in tire 200c, charge dissipates from bead 110, through the intermediate elastomeric layer 210 (through the sidewall and belt package, via the conductive bleeder cord), through an adjacent connection to antenna 225, and then to ground.

Figure 3:
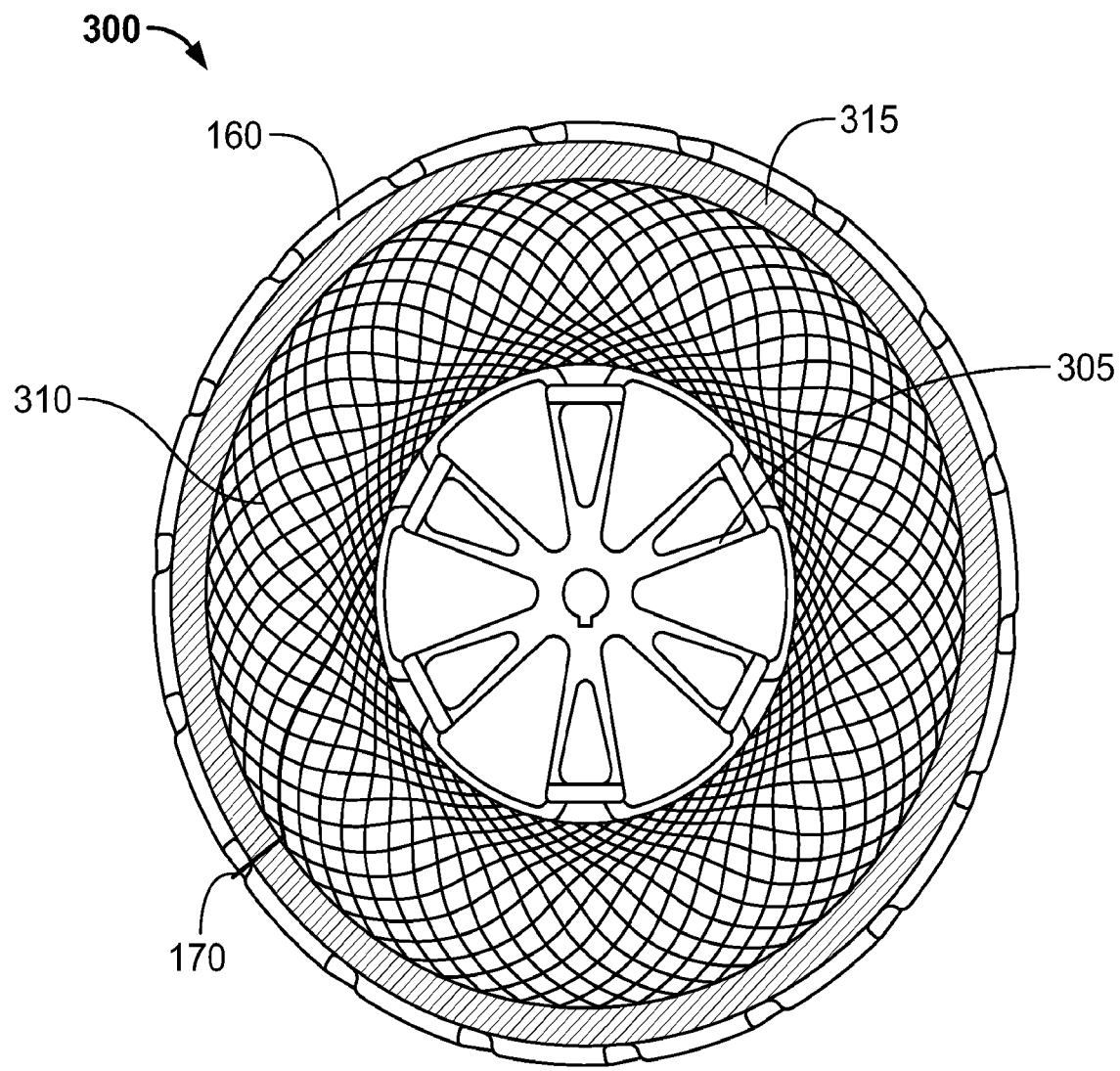
FIG. 3 is a side cross-sectional view of one embodiment of a non-pneumatic tire including a conductive bleeder cord.

FIG. 3 is a side cross-sectional view of one embodiment of a non-pneumatic tire 300 including a conductive bleeder cord 170. Non-pneumatic tire 300 is shown as including a wheel 305. In one embodiment, wheel 305 is an integral component of non-pneumatic tire 300. In another embodiment, wheel 305 is a detachable component of non-pneumatic tire 300.

Non-pneumatic tire 300 further includes spokes 310. Spokes 310 form an annular structure that is configured to interface with wheel 305 and help the tire bear the vehicle load. In additional alternative embodiments (not shown), the spokes have an arched, honeycomb, radial, octagonal, or other equivalent structure.

Non-pneumatic tire 300 further includes an annular band 315 and a circumferential tread 160. Annular band 315 is disposed between spokes 310 and circumferential tread 160 and provides a surface for circumferential tread 160 to adhere to the tire. In one embodiment (not shown), the annular band is an intermediate elastomeric layer.

Figure 4:
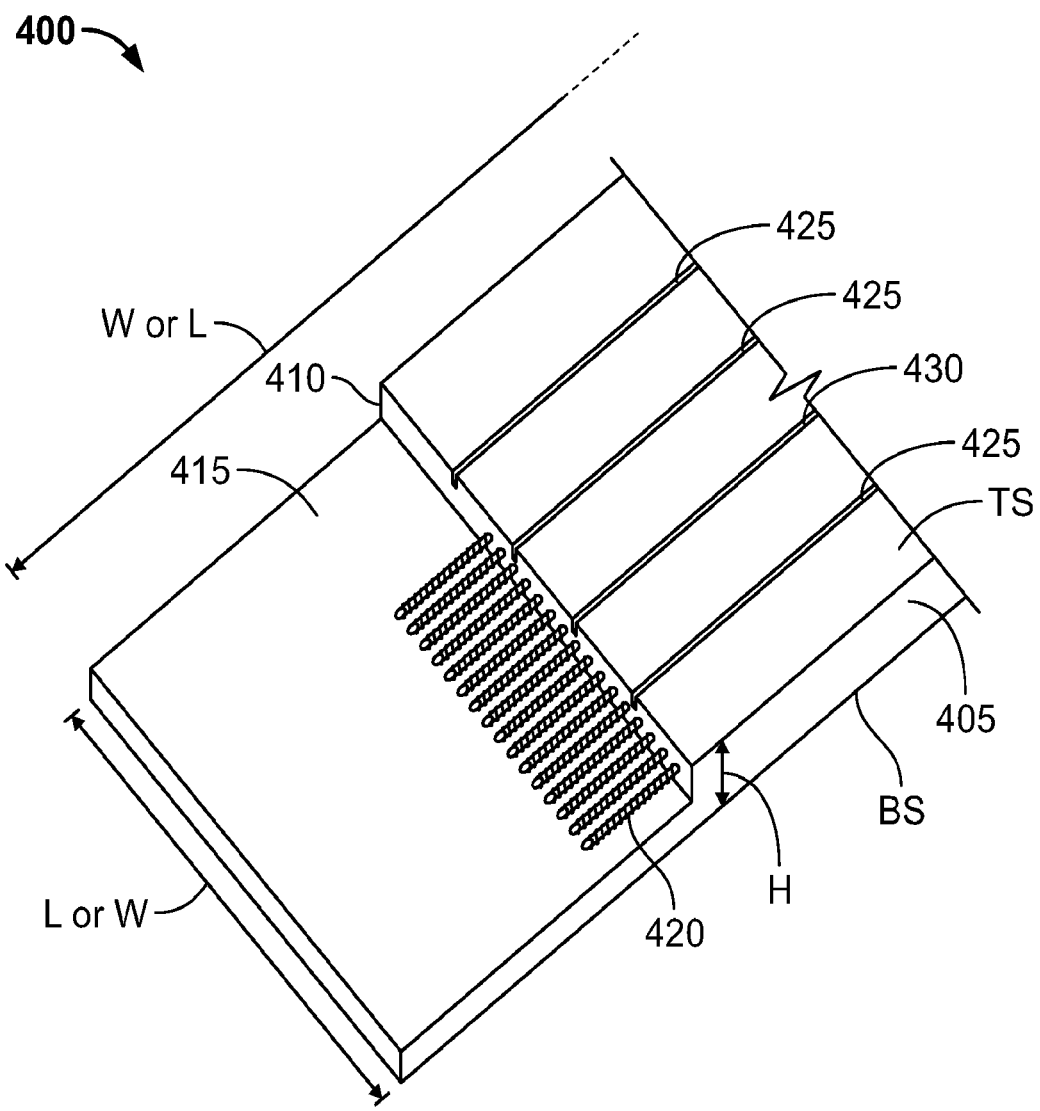
FIG. 4 is a peel-away perspective view of one embodiment of a conductive body ply.

FIG. 4 is a peel-away perspective view of one embodiment of a conductive body ply 400. As one of ordinary skill in the art will understand, conductive body ply 400 may be used with the tire embodiments described in FIG. 1 and FIG. 2 above.

Body ply 400 has a rubber core 405 defined by a top surface TS and a bottom surface BS. Both the top surface TS and bottom surface BS have substantially the same length L and a width W. Rubber core 405 is further defined by side surfaces having a common height H. In FIG. 4, rubber core 405 is divided into a top rubber layer 410 and a bottom rubber layer 415. In scaled production, a body ply sheet may be between 10-60 inches (0.25-1.5 m) wide and 3,000 yards (2,700 m) long, running longer or shorter according to plant demand. The body ply sheet may then be cut into smaller sheets.

Body ply 400 further comprises reinforcement cords 420. Reinforcement cords 420 are disposed between top rubber layer 410 and bottom rubber layer 415. In one embodiment, the body ply cords span the width of the body ply and are spaced approximately 0.1-4.0 mm apart from each other.

Body ply 400 also comprises bleeder cords 425. Bleeder cords 425 are configured to vent gas from a tire during vulcanization. The bleeder cords 425 are disposed in connection with the body ply and spaced approximately 8-12 cm apart from each other. In one embodiment, the bleeder cords are disposed on the upper surface of the top rubber layer. In another embodiment, the bleeder cords are disposed between the top rubber layer and the bottom rubber layer. While the bleeder cords are illustrated as following straight, parallel paths, it should be understood that one or more of the bleeder cords may follow a wavy path.

Body ply 400 further includes conductive cords 430. Conductive cords 430 are configured to dissipate electric charge from the tire after the tire has been vulcanized, and the conductive cords 430 may also be configured to vent gas from a tire during vulcanization. Conductive cords 430 are disposed in connection with the body ply, and spaced approximately 20-80 cm apart from each other. In one embodiment, the conductive cords are disposed on the upper surface of the top rubber layer. In another embodiment, the conductive cords are disposed between the top rubber layer and the bottom rubber layer. In an alternative embodiment, the conductive cords border the bleeder cords.

In yet another embodiment, the conductive cords are blended cords, which are cords that have been blended with a metallic component. In one embodiment, the metallic component of the conductive cords is made of steel selected from the group consisting of carbon steel, austenitic steel, and martensitic steel. In an alternative embodiment, the metallic component of the conductive cords is made of copper.

The conductive cords 430 may be disposed independently of the bleeder cords. In a specific embodiment, the conductive cords substitute for a bleeder cords at a given interval (e.g., one conductive cord replaces, without limitation, every fifth, seventh, or tenth bleeder cord).

A protruding segment of the conductive cords 430 may extend outward from the body ply. The protruding segment may extend into other components of the tire or lie passively on the surface of the body ply. For example, in one embodiment, the conductive cords extend into an undertread or subtread. In an alternative embodiment, the conductive cords extend to a tread antenna.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized, without limitation, in high-performance, winter, all-season, touring, non-pneumatic, and retread tire applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   a first annular bead;
   a first abrasion area, wherein the first abrasion area has a resistivity of at least $5.9 \times 10^7$ ohm-cm;
   a second annular bead;
   a second abrasion area, wherein the second abrasion area has a resistivity of at least $5.9 \times 10^7$ ohm-cm;
   a body ply extending between the first annular bead and the second annular bead, wherein the body ply contains reinforcement cords;
   a circumferential belt disposed radially upward of the body ply and extending axially across a portion of the body ply;
   at least one cap ply disposed radially upward of the circumferential belt and extending axially across a portion of the circumferential belt, wherein the at least one cap ply has a resistivity of at least $13.0 \times 10^7$ ohm-cm;
   a circumferential tread disposed radially upward of the at least one cap ply and extending axially across the at least one cap ply, wherein the circumferential tread has resistivity of at least $13.7 \times 10^7$ ohm-cm;
   a first sidewall extending between the first annular bead and a first shoulder, the first shoulder being associated with the circumferential tread, wherein the first sidewall has a resistivity of at least $11.9 \times 10^7$ ohm-cm;
   a second sidewall extending between the second annular bead and a second shoulder, the second shoulder being associated with the circumferential tread, wherein the second sidewall has a resistivity of at least $11.9 \times 10^7$ ohm-cm;
   a plurality of bleeder cords associated with the body ply and disposed circumferentially about the tire and radially between the circumferential tread and the body ply, wherein the plurality of bleeder cords includes a plurality of non-conductive bleeder cords, and wherein the plurality of bleeder cords further includes at least one conductive bleeder cord formed of a stainless steel-cotton blend yarn having a stainless steel-to-cotton ratio between 70:30 and 85:15, wherein the stainless steel-cotton blend yarn has a linear mass density between 320 and 450 tex, and wherein the at least one conductive bleeder cord extends from one of the beads and terminates in a middle third of a tread width.

2. The tire of claim 1, wherein the circumferential tread further includes a tread antenna having a resistivity of at least $1 \times 10^5$ ohm-cm.

3. The tire of claim 1, wherein the plurality of bleeder cords includes a second conductive bleeder cord formed of a stainless steel-cotton blend yarn and having a stainless steel-to-cotton ratio between 55:45 and 90:10.

4. The tire of claim 1, wherein the at least one conductive bleeder cord of the plurality of bleeder cords has a resistivity between 2.8 and $4.0 \times 10^4$ ohm-cm.

5. The tire of claim 1, wherein the at least one conductive bleeder cord includes a plurality of conductive bleeder cords.

6. The tire of claim 5, wherein the plurality of bleeder cords are arranged in intervals of four non-conductive bleeder cords followed by a conductive bleeder cord.

7. The tire of claim 1, wherein each conductive bleeder cord is spaced from an adjacent conductive bleeder cord by a distance between 20-80 cm.

8. The tire of claim 1, wherein the stainless steel-cotton blend yarn includes a steel cord having a thickness between 0.2 and 0.7 mm.

9. The tire of claim 1, wherein the stainless steel-cotton blend yarn includes steel selected from the group consisting of carbon steel, austenitic steel, and martensitic steel.

* * * * *